US011112507B2

(12) United States Patent
Dill (10) Patent No.: US 11,112,507 B2
(45) Date of Patent: *Sep. 7, 2021

(54) LOCATION CORRECTION THROUGH DIFFERENTIAL NETWORKS SYSTEM

(71) Applicant: United States of America as represented by the Administrator of NASA, Washington, DC (US)

(72) Inventor: Evan T. Dill, Poquoson, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 459 days.

This patent is subject to a terminal disclaimer.

(21) Appl. No.: 15/665,716

(22) Filed: Aug. 1, 2017

(65) Prior Publication Data

US 2018/0120445 A1    May 3, 2018

Related U.S. Application Data

(60) Provisional application No. 62/413,454, filed on Oct. 27, 2016.

(51) Int. Cl.
  *G01S 19/41*    (2010.01)
  *G01S 19/04*    (2010.01)
  (Continued)

(52) U.S. Cl.
  CPC ............ *G01S 19/41* (2013.01); *G01S 19/04* (2013.01); *G01S 19/071* (2019.08); *G01S 19/43* (2013.01)

(58) Field of Classification Search
  CPC .......... G01S 19/04; G01S 19/07; G01S 19/22; G01S 19/41; G01S 19/43; G01S 19/44; H01Q 1/246; H04W 4/02
  See application file for complete search history.

(56) References Cited

U.S. PATENT DOCUMENTS

| 5,563,917 A | * | 10/1996 | Sheynblat | ............... G01S 19/41 |
| | | | | 375/346 |
| RE35,498 E | * | 4/1997 | Barnard | ............... G01S 5/0036 |

(Continued)

FOREIGN PATENT DOCUMENTS

| CN | 102565816 B | * | 10/2013 | | |
| EP | 0574009 A2 | * | 12/1993 | ............ | G01S 19/41 |
| JP | 09311177 A | * | 12/1997 | | |

OTHER PUBLICATIONS

B.W. Parkinson et al., Global Positioning System: Theory and Applications, vol. 2; Progress in Astronautics and Aeronautics, vol. 164, American Institute of Aeronautics and Astronautics, Inc., p. 3-50, 1996 (Year: 1996).*

(Continued)

*Primary Examiner* — Bernarr E Gregory
*Assistant Examiner* — Fred H Mull
(74) *Attorney, Agent, or Firm* — M. Bruce Harper; Andrea Z. Warmbier; Helen M Galus (57) ABSTRACT

A method may be executed by a base station or mobile device to improve accuracy of a global positioning system (GPS)-based position or "geoposition" of the mobile device. A time-stamped first set of GPS data may be received via a GPS receiver, e.g., of the base station. A second set of GPS data describing a geoposition of the mobile device is received from the mobile device by the base station. A time of collection of the base station and mobile device GPS data coincides. The GPS data includes code phase and pseudo-range data from each of the GPS satellites, and may include carrier phase data. A predetermined GPS position correction technique is used to generate a corrected geoposition of the mobile device using the GPS data. The corrected geoposition is then transmitted to the mobile device and/or an external response system such as a drone or first responder.

20 Claims, 3 Drawing Sheets

(51) Int. Cl.
*G01S 19/43* (2010.01)
*G01S 19/07* (2010.01)

(56) References Cited

U.S. PATENT DOCUMENTS

| | | | | | |
|---|---|---|---|---|---|
| 5,663,734 | A | * | 9/1997 | Krasner | G01S 19/04 342/357.25 |
| 5,916,300 | A | * | 6/1999 | Kirk | G01S 19/44 701/468 |
| 5,928,306 | A | * | 7/1999 | France | G01C 21/20 342/451 |
| 5,987,329 | A | * | 11/1999 | Yost | H04W 64/00 342/357.31 |
| 6,104,338 | A | * | 8/2000 | Krasner | G01S 19/41 342/357.24 |
| 6,198,430 | B1 | | 3/2001 | Hwang et al. | |
| 6,229,478 | B1 | * | 5/2001 | Biacs | G01S 19/04 342/357.42 |
| 6,844,856 | B1 | * | 1/2005 | Wright | H01Q 1/28 342/357.31 |
| 7,586,438 | B1 | | 9/2009 | Lawrence et al. | |
| 2004/0051700 | A1 | * | 3/2004 | Pensjo | G06F 1/1626 345/173 |
| 2004/0253985 | A1 | * | 12/2004 | Cooper | H01Q 1/246 455/562.1 |
| 2005/0001763 | A1 | * | 1/2005 | Han | G01S 19/44 342/357.31 |
| 2005/0216210 | A1 | | 9/2005 | Bartone et al. | |
| 2006/0267836 | A1 | * | 11/2006 | Bird | G01S 19/04 342/357.41 |
| 2012/0176271 | A1 | * | 7/2012 | Dai | G01S 19/073 342/357.44 |
| 2014/0184442 | A1 | * | 7/2014 | Large | G01S 19/41 342/357.42 |
| 2016/0196525 | A1 | * | 7/2016 | Kantor | G08G 5/0013 705/330 |
| 2016/0377730 | A1 | * | 12/2016 | Drescher | G01S 19/13 342/357.23 |
| 2017/0269231 | A1 | * | 9/2017 | Dai | G01S 19/44 |
| 2017/0332192 | A1 | * | 11/2017 | Edge | H04W 4/02 |
| 2018/0199306 | A1 | * | 7/2018 | Edge | G01S 19/071 |
| 2020/0174135 | A1 | * | 6/2020 | Gong | G01S 19/41 |

OTHER PUBLICATIONS

R. Braff, Description of the FAA's Local Area Augmentation System (LAAS), Journal of The Institute of Navigation, vol. 44(4), p. 411-423, Winter 1997-1998 (Year: 1998).*

English Translation of JP 09311177 A (Year: 2000).*

R. Gilabert et al., Location corrections through differential networks (LOCD-IN), IEEE/ION Position, Location and Navigation Symposium (PLANS), p. 382-388, Apr. 2018 (Year: 2018).*

Navstar GPS Space Segment/Navigation User Interfaces, Interface Specification IS-GPS-200, Revision H, 226 pages, Sep. 24, 2013 (Year: 2013).*

Trimble, Trimble GPS Tutorial—Advanced Concepts, http://www.trimble.com/gps_tutorial/dgps-advanced.aspx, Oct. 2015 (Year: 2015).*

English Translation of CN 102565816 B (Year: 2021).*

Dickman, Jeff et al., "Characterization and Performance of Prototype Wideband Airport Pseudolite Multipath Limiting Antenna for the Local Area Augmentation System," ION, 2003 National Technical Meeting, Jan. 22-24, 2003, TIB—German National Library of Science and Technology, pp. 783-793, Anaheim, CA.

Hatch, Ron, "The Synergism of GPS Code and Carrier Measurements," International Geodetic Symposium on Satellite Doppler Positioning, Feb. 8-12, 1982, pp. 1213-1231, vol. 2.

Parkinson, Bradford et al., "Global Positioning System: Theory and Applications vol. I", Progress in Astronautics and Aeronautics, 1996, pp. 547-568, vol. 163.

Definition for standard deviation. (1992). Academic Press Dictionary of Science and Technology (4th ed.). Elsevier Science & Technology. Credo Reference: https://search.credoreference.com/content/entry/apdst/standard_deviation/0, 1992 (Year: 1992).

* cited by examiner

LOCATION CORRECTION THROUGH DIFFERENTIAL NETWORKS SYSTEM

CROSS-REFERENCE TO RELATED PATENT APPLICATION

This patent application claims the benefit of and priority to U.S. Provisional Patent Application No. 62/413,454, filed on Oct. 27, 2016, which is hereby incorporated by reference in its entirety.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefor.

BACKGROUND OF THE INVENTION

Mobile devices such as cell phones and tablet computers may be equipped with Global Positioning System (GPS) chipsets and receivers, and thus are able to use built-in GPS capabilities for a variety of beneficial purposes. GPS is a worldwide satellite-based navigation system that relies on an earth-orbiting constellation of satellites to facilitate precise geoposition identification of GPS-equipped devices. Each GPS satellite continuously broadcasts data in the form of a navigation message containing pseudo-range, code phase, and carrier phase information. Timing of the GPS data is driven by an atomic clock, with an encoded time in the form of a GPS time stamp received by the GPS-equipped device. The time difference between broadcast and receipt of the time-stamped GPS data is used to calculate approximate distances between the GPS-equipped device and the orbiting GPS satellites. Determination of a position of the device is thus possible in two or three dimensions (latitude and longitude, and possibly altitude) when a corresponding distance is known for three or four GPS satellites, respectively.

The quantity and variety of mobile applications using onboard GPS capabilities has exploded in recent years. However, the functionality of the types of GPS receivers and associated chipsets typically used in modern mobile devices is limited by the reduced size, weight, power, and cost requirements of the receiving device. Research suggests that the available positioning accuracy for a typical handheld mobile device is around 5-15 meters (m) or 8-20 m depending on the device. While such levels of accuracy may be more than adequate for general navigation and other common GPS-based applications, higher levels of accuracy may be required, for instance in drone-based package delivery, gaming, or search-and-rescue/first responder dispatch efforts.

SUMMARY OF THE INVENTION

A method is disclosed herein for situationally increasing the available global positioning system (GPS) positioning accuracy of a global positioning system (GPS)-equipped and internet-enabled mobile device, e.g., a cell phone or tablet computer. The disclosed method takes advantage of systems and techniques associated with high-accuracy GPS positioning in combination with relatively low-quality GPS-related hardware components of the mobile device so as to situationally increase positional accuracy, and to thereby enable applications that require more a precise GPS position or "geoposition."

The mobile device is in remote communication with multiple earth-orbiting GPS satellites and a fixed (stationary) base station having a reference geoposition. In some embodiments, the mobile device may be in communication with a deployable response system, e.g., a first responder vehicle or a package delivery drone. In other embodiments, the mobile device may effectively function as the response system, such as when a user of the mobile device views the improved geoposition via a display screen of the mobile device and conducts any number of possible automated operations or manual activities with the benefit of more precise knowledge of the user's true geoposition.

The method according to an example embodiment includes determining a geoposition of the fixed base station as a reference GPS position using a time-stamped first set of GPS data from each of the GPS satellites, and establishing an internet connection between the fixed base station and the mobile device. The method may include determining, over the established internet connection, a time-stamped second set of GPS data describing the geoposition of the mobile device. A time of collection of the time-stamped first and second sets of GPS data coincide, i.e., are the same, and include code phase data and pseudo-range data from each of the GPS satellites. The method may include generating a corrected geoposition of the mobile device using a predetermined GPS position correction technique, the time-stamped first and second sets of GPS data, and a chipset or processor of the base station or the mobile device. Thereafter, the method may include using the corrected geoposition to control an action of the mobile device and/or an external response system.

Generating the corrected geoposition may include using a differential GPS technique, a Real Time Kinematic (RTK) technique, or techniques similar to those used in a Local Area Augmentation System (LAAS)/Ground Based Augmentation System (GBAS) in different embodiments. Thereafter, an action of the response system may be requested and/or controlled responsive to the corrected geoposition of the mobile device.

A base station is also disclosed herein that has a fixed geoposition. The base station may also include a GPS receiver configured to receive a time-stamped first set of GPS data from each of the GPS satellites, a chipset or processor in communication with the GPS receiver, and memory containing recorded instructions. When executed by the processor, the instructions cause the base station to receive a second set of GPS data from a mobile device in networked connection with the base station. The second set of GPS data describes a geoposition of the mobile device and has a time of collection that coincides with a time of collection of the time-stamped first set of GPS data. The first and second sets of GPS data include code phase data and pseudo-range data from each of the GPS satellites. Using a predetermined GPS position correction technique, the base station generates a corrected geoposition of the mobile device via the processor and the first and second sets of GPS data. Thereafter, the base station transmits the corrected geoposition to the mobile device and/or an external response system.

A mobile device is also disclosed. In a possible embodiment, the mobile device includes a GPS receiver configured to receive a time-stamped set of GPS data from each of a plurality of GPS satellites, a chipset or processor in communication with the GPS receiver, and memory on which is recorded instructions that, when executed by the processor, cause the mobile device to execute a method. In various steps, the method may include establishing an internet connection with the base station, and receive another time-stamped set of GPS data from the base station describing a fixed geoposition of the base station. A time of collection of the time-stamped sets of GPS data from the mobile device and the base station coincide, and include at least code phase data and pseudo-range data from each of the GPS satellites. The mobile device also generates, via a predetermined GPS position correction technique, a corrected geoposition of the mobile device using the processor and the first and second sets of GPS data. A control action is then executed over the mobile device and/or an external response system using the corrected geoposition.

These and other features, advantages, and objects of the present disclosure will be further understood and readily apparent from the following detailed description of the embodiments and best modes for carrying out the disclosure by referring to the specification, claims, and appended drawings.

The present disclosure is susceptible to various modifications and alternative forms, and some representative embodiments are shown by way of example in the drawings. It should be understood that novel aspects of this disclosure are not limited to the particular forms illustrated in the appended drawings. Rather, the disclosure is intended to cover all modifications, equivalents, combinations, and alternatives falling within the scope and spirit of the disclosure as defined by the appended claims.

DETAILED DESCRIPTION OF THE INVENTION

Disclosed herein are method and system for increasing global positioning system (GPS)-based position accuracy of internet-capable cell phones, tablet computers, or other mobile devices. The disclosed method takes advantage of available GPS data and other measurements such as pseudo-range, code phase, and/or carrier phase data, combined with corresponding GPS data and other measurement information provided over an internet or other wireless connection from one or more stationary base stations. For example, the method may take advantage of the Continuously Operating Reference Stations (CORS) operated by the U.S. National Geodetic Survey, and as typically used for positioning, meteorology, weather, and geophysical applications, or the Networked Transport of Radio Technical Commission for Maritime Services (RTCM) via Internet Protocol, i.e., the NTRIP protocol. The separate base station and mobile device data is processed using a predetermined GPS positional correcting technique, e.g., Differential GPS, Real-Time Kinematic (RTK) GPS, and/or using techniques similar to or variants of those used in the Local Area Augmentation System (LAAS) in three possible embodiments. Such techniques are able to remove atmospheric distortion and other errors common to coinciding GPS measurements of the base station and mobile device to the extent such errors correlate, thereby increasing the level of accuracy of position estimates of the mobile device.

As is well known in the art, a typical GPS receiver uses a self-generated pseudo-random code or "pseudo-code" to determine the time of propagation of unique pseudo-random codes emitted by each orbiting GPS satellite. The term "pseudo-range" as used herein refers to uncorrected distance measurements that are based on a correlation between the satellite-emitted pseudo-codes and the GPS receiver's locally-generated code. Carrier-phase processing techniques use the GPS satellite's carrier frequency, which is typically higher than the pseudo-random code frequency. This is done to more accurately calculate the geoposition of the GPS receiver. The carrier frequencies may be 1575.42 MHz, i.e., the L1 carrier frequency, and 1227.60 MHz (the L2 carrier frequency). While carrier frequency-based correction techniques such as RTK or LAAS tend to be more accurate than pure differential techniques that rely solely on the code phase and pseudo-range information, the possible distances between the mobile device and the base station are more limited with such techniques. For example, differential techniques may be used up to about 90-100 km on certain applications, while RTK techniques and techniques used in LAAS may be usable up to about 30 km for similar applications, albeit at additional cost and complexity relative to implementation of basic differential techniques.

Figure 1:
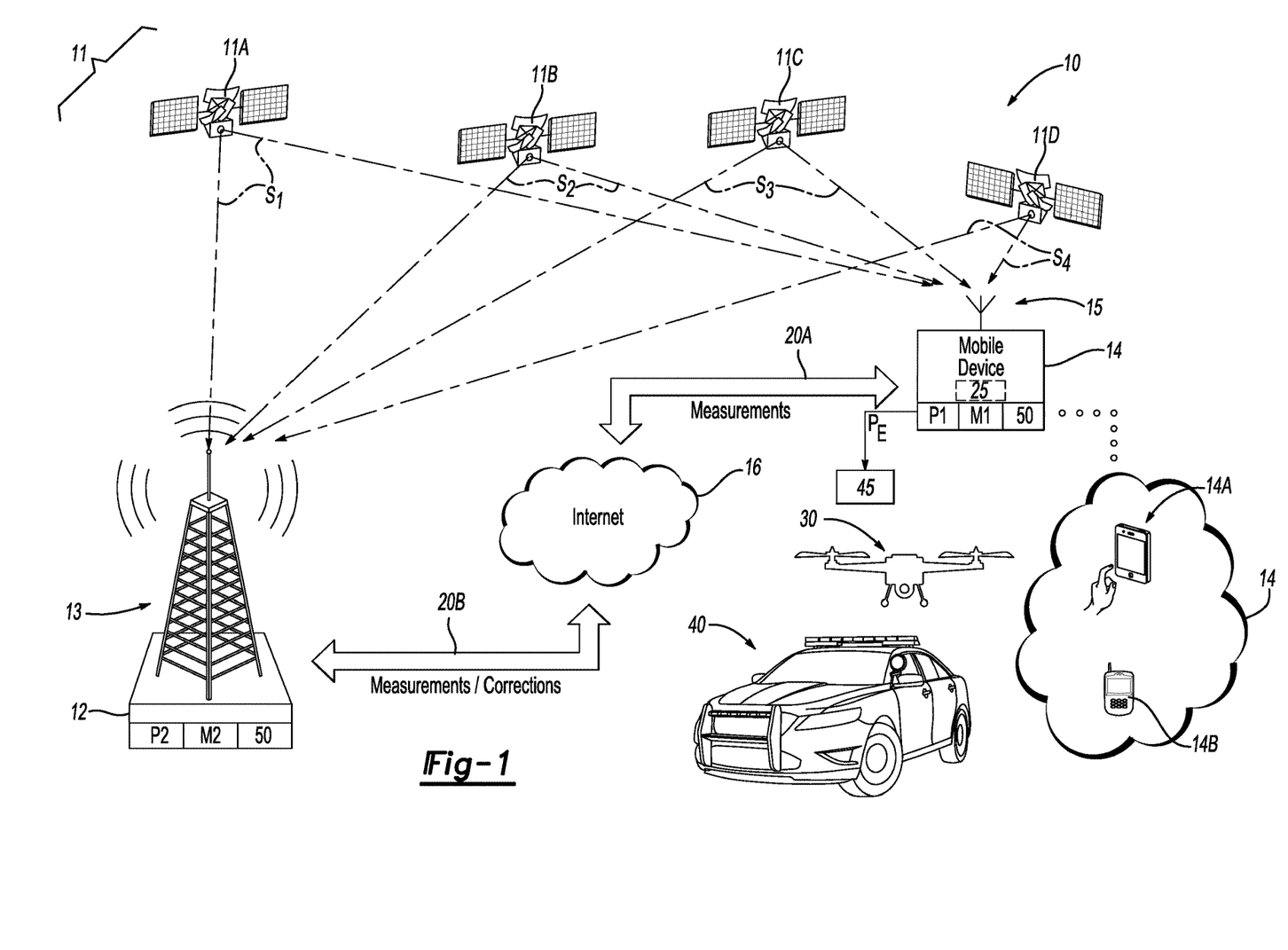
FIG. 1 is a schematic illustration of a system according to an example embodiment in which a differential correction technique or a Real Time Kinematic (RTK) technique are employed to situationally improve the global positioning system (GPS) accuracy of a mobile device.

Referring to FIG. 1, a Location Corrections Through Differential Networks or "LOCD-IN" system 10 includes a stationary base station 12 in remote networked communication with a global positioning system (GPS)-equipped mobile device 14, e.g., a tablet computer 14A, cell phone 14B, or other portable electronic device equipped with a chipset or processor (P1), memory (M1), and a GPS antenna or receiver 15. The base station 12 and the mobile device 14 are in remote communication with a plurality of GPS satellites 11, shown as four representative GPS satellites 11A, 11B, 11C, and 11D.

Depending on orbital path, time of day, and line of sight obstructions, more or fewer GPS satellites 11 may be in view at a given time and thus usable by the base station 12 and the mobile device 14 at a given time. The base station 12 is stationary and thus has a relatively well known three-dimensional reference geospatial position or "geoposition" in terms of latitude, longitude, and altitude. The base station 12 includes an antenna or other GPS receiver 13 that, along with a processor P2 and memory M2, enables the base station 12 to accurately identify its geospatial position or "geoposition" to a first level of accuracy. Similarly, the mobile device 14, being handheld, typically has a time-varying geoposition as a user of the mobile device 14 moves relative to the fixed base station 12.

A single base station 12 and mobile device 14 are shown in FIG. 1 solely for the purpose of illustrative simplicity. Those of ordinary skill in the art will appreciate that multiple base stations 12 and mobile devices 14 may be used in other embodiments, with an example of such an embodiment shown in FIG. 3 and described below. Therefore, singular descriptions provided herein with respect to the number of base stations 12 or mobile devices 14 are intended to apply equally to multiple base stations 12 or mobile devices 14 when used as part of the system 10.

Figure 2:
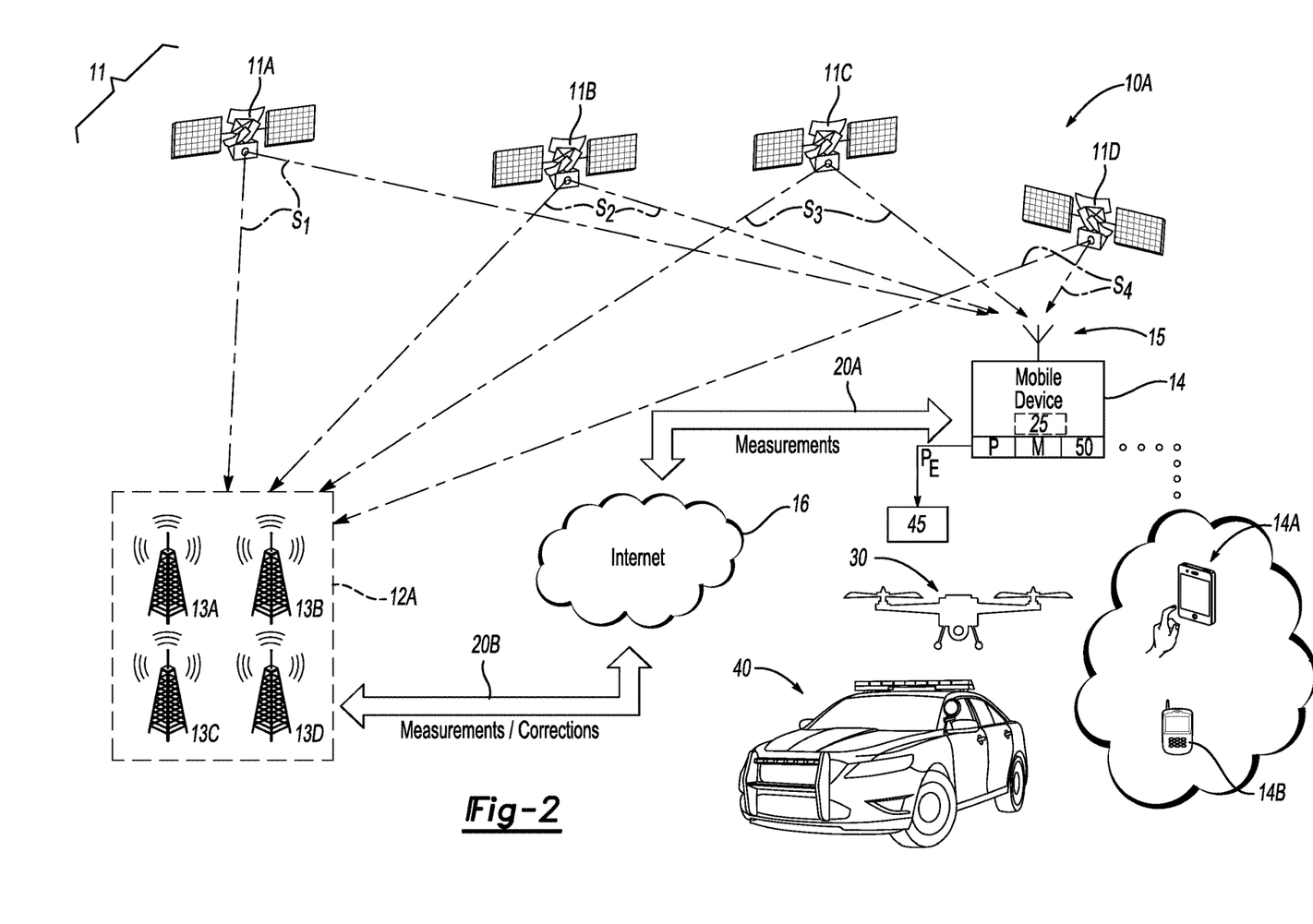
FIG. 2 is an alternative embodiment of the system shown in FIG. 1 utilizing GPS-based position correction techniques similar to those used in a Local Area Augmentation System (LAAS).
Figure 3:
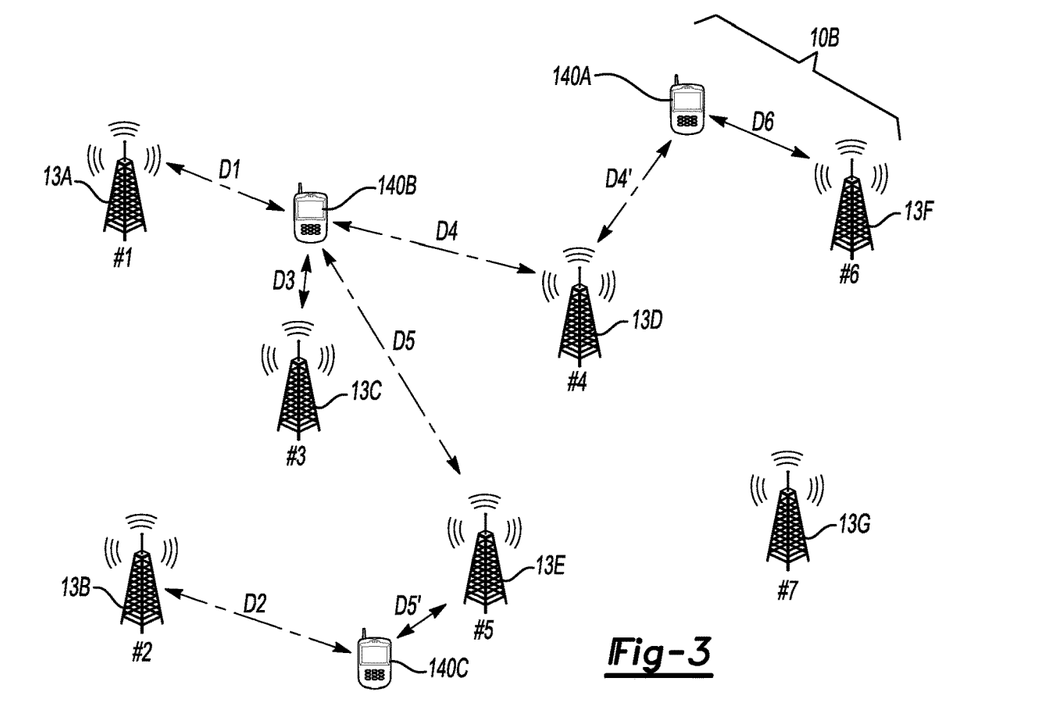
FIG. 3 is a schematic illustration of an application of the systems of FIGS. 1-2 in a distributed network having multiple base stations.

The LOCD-IN system 10 of FIG. 1, as with the alternative LOCD-IN systems 10A and 10B of FIGS. 2 and 3, is configured to situationally improve upon existing levels of GPS location accuracy of the mobile device 14. As noted above, the accuracy or resolution of the mobile device 14 may be limited due to restrictions on packaging size, weight, or power requirements of the mobile device 14. Such restrictions tend to result in use of a lower cost, lower performance receiver 15 and processor (P1) aboard the mobile device 14. For everyday GPS applications such as turn-by-turn navigation or social media-based location reporting, the uncorrected GPS-based positional resolution may be sufficient. However, situations may periodically arise in which the available GPS position accuracy of the mobile device 14 is inadequate.

An example of such a situation is a scheduled aerial delivery of a package to a specific mailing address, e.g., via an autonomous or remotely piloted drone 30. Another example may be that of a first responder 40, such as a police squad car as shown, search and rescue teams, firefighters, or emergency medical services requiring a more precise knowledge of the geoposition of the mobile device 14. When improved accuracy is required, whether prompted by the base station 12 or initiated by a user of the mobile device 14, the user may request execution of a method 50 for processing on the mobile device 14 and/or via the processor (P2) or chipset of the base station 12, or via a server or another remote device. Although not necessary, such an accuracy improvement request may be generated in some embodiments by touching a touch screen-displayed activation icon 25 on the mobile device 14 or by pressing a physical button (not shown).

The base station 12 and the mobile device 14 separately receive GPS data signals (arrows $S_1$, $S_2$, $S_3$, $S_4$) from the receptive GPS satellites 11A, 11B, 11C, and 11D. The receiver 15 and processor (P1) of the mobile device 14 together identify an uncorrected geoposition of the mobile device 14 to a second level of accuracy that, due to the lower cost and size of the receiver 15 and processor (P1), is less than the first level of accuracy of the base station 12. Thus, the base station 12 serves herein as reference geoposition and data source to situationally correct for errors in the available geoposition accuracy of the mobile device 14, doing so without requiring hardware modification to the low-cost receiver 15 and associated processor (P1) of the mobile device 14.

In the depicted embodiment of FIG. 1, the mobile device 14 determines its geoposition via communication with each GPS satellite 11 that is in view of the mobile device 14 at a given moment. Thereafter, the mobile device 14 automatically refines the GPS-based position estimates using unprocessed measurements (arrows 20A and 20B) as transmitted by the base station 12 through an internet connection 16. In other embodiments, onboard processing may be performed by the mobile device 14, such that the base station 12 relays its own geoposition as a set of GPS measurements and the mobile device 14 performs the necessary correction techniques using the processor (P1).

When using code phase-based data, the receivers 13 and 15 are used to establish the respective geopositions of the base station 12 and the mobile device 14 by determining pseudo-ranges to each of the orbiting GPS satellites 11 as noted above. The base station 12 may thereafter transmit its determined pseudo-ranges and/or code phase information to the mobile device 14, or vice versa, with subsequent calculations thereafter performed by the processor of the receiving device, for instance the processor P1 of the mobile device 14. The base station 12 and/or the mobile device 14 may thereafter execute a suitable control action using the corrected geoposition of the mobile device 14. For example, a response system 45 may be embodied as the drone 30 or the first responder 40, in which case the corrected geoposition (arrow $P_E$) may be transmitted to the drone 30 or first responder 40 to more accurately direct the drone 30 or first responder 40 to the user of the mobile device 14, or a location specified by the user of the mobile device 14.

Alternatively, the base station 12 of FIG. 1 may use Real-Time Kinematic (RTK) correction to improve geoposition accuracy of the mobile device 14. As is known in the art, RTK functions by determining a number of carrier cycles between the GPS satellites 11 and each of the mobile device 14 and base station 12, and thereafter multiplying the number of carrier cycles by the known carrier wavelength as reported by the GPS satellites 11. The optional RTK embodiment of the present system 10 thus adds carrier-phase GPS information to the available pseudo-range and code phase information noted above.

RTK techniques may be used to help remove errors that are common to both the base station 12 and the mobile device 14, such as clock errors of the GPS satellites 11 or the base station 12 or mobile device 14, ionosphere errors, and/or atmospheric noise. Phase measurements may be used after correcting for such common errors in order to determine the geoposition of the mobile device 14 in a Cartesian reference frame, within a few centimeters of accuracy in some instances depending on the quality of the GPS receiver 15 and the chipset (P1). In the present application, GPS accuracies of 1-2 meters or less may be possible and sufficient without modifying the low-cost receiver 15 and processor P1 of the mobile device 14.

FIG. 2 depicts another example embodiment utilizing correction techniques similar to those of the Local Area Augmentation System (LAAS) to improve GPS accuracy relative to the differential and RTK techniques described above. LAAS, now more commonly referred to as the Ground Based Augmentation System (GBAS), is most often used to provide corrections to aircraft in the vicinity of an airport. A typical LAAS/GBAS facility may include collocated GPS receivers, a processor/CPU/chipset, and a VHF Data Broadcast (VDB) transmitter. Orbiting aircraft include a GPS receiver, VHF antenna, and an associated chipset. The base station thus uses the available VHF link to transmit GPS corrections to the aircraft. For instance, the base station is able to average the slightly different GPS position measurements from each of the multiple receivers 13A, 13B, 13C, and 13D to thereby minimize common error between the receivers 13A, 13B, 13C, and 13D.

In an example system 10A, the mobile device 14 refines its GPS-based position estimates using corrections for a local area computed and transmitted by the base station 12, e.g., via data broadcast or other networked devices. The base station 12A in this embodiment includes a plurality of collocated GPS receivers, i.e., the receivers 13A, 13B, 13C, and 13D noted above. The receivers are in close proximity to each other, such as within a few meters, so as to function as a larger and more accurate base station 12A relative to the more limited configuration of FIG. 1. As with RTK, the correction processes used by LAAS/GBAS are more accurate but also tend to be more expensive than basic differential correction techniques. Therefore, the example embodiment of FIG. 2 may be used when increased accuracy is required and justified by the tradeoff in cost.

FIG. 3 illustrates any of the above-described geoposition correction techniques using a system 10B with multiple GPS receivers 13A, 13B, 13C, 13D, 13E, 13F, and 13G corresponding to a given base station 12 of FIGS. 1 and 2, sequentially numbered #1-7 in FIG. 3 for clarity, respectively for the above-noted receivers, and distributed across a wider geographic area relative to FIGS. 1 and 2. In an example drone-based package delivery application, for instance, the various base stations 12 may be arranged on the roofs of package distribution facilities spread across a wide distribution region. Using two-way communication between the mobile device 14 and the base stations 12, the GPS locational accuracy is maximized by selecting the nearest base station 12 based off of the geoposition of the mobile device 14 working in a standalone fashion.

For instance, a first mobile device 140A may be paired with a base station (#6), a second mobile device 140B may be paired with a base station (#3), and a third mobile device 140C may be paired with a base station (#5). Pairing may occur automatically via the processors P1 and/or P2 based on closest proximity, i.e., using the calculated geoposition. By way of illustrative example, the mobile device 140A may conceivably communicate with base stations #4 at a distance D4' and with base station #6 at a distance D6. By simple comparison, the distance D6 may be selected by the mobile device 14 as the closest of the base stations 12, thereafter initiating geoposition correction using the base station #6. In the same way, mobile device 140B may determine that distance D3 to base station #1 is shorter than the distances D1, D4, and D5 to base stations #4 and #5, respectively. Similarly, the mobile device 140C may determine that the distance D5' to base station #5 is shorter than distance D2 to base station #2 and thereafter select base station #5 responsive to this determination.

Figure 4:
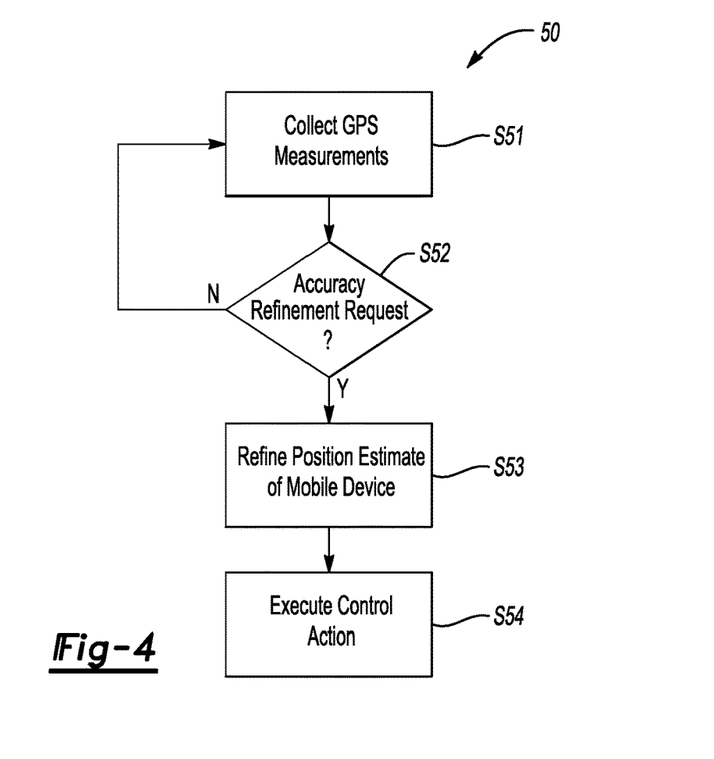
FIG. 4 is a flow chart describing an example method for situationally improving the geoposition accuracy of a mobile device using the systems depicted in FIGS. 1-3.

FIG. 4 is a flow chart describing an example embodiment of the method 50. Beginning with step S51, and with reference to the systems 10, 10A, and 10B of FIGS. 1-3, the method 50 commences after or shortly before establishing an internet connection between the fixed base station 12 and the mobile device 14. As part of step S51, the method 50 may include determining a geoposition of the fixed base station 12 as a reference GPS position, doing so using a time-stamped first set of GPS data from each of the GPS satellites 11. Step S51 may include receipt of the GPS signals S1, S2, S3, and S4 via the GPS receiver 13 of the base station 12 shown in FIG. 1, for instance, concurrently with receipt of the signals S1, S2, S3, and S4 by the GPS receiver 15 of the mobile device 14. The method 50 then proceeds to step S52.

At step S52, the method 50 includes detecting or otherwise determining whether an accuracy refinement request was made indicative of a need for improved accuracy of the GPS location of the mobile device 14. Step S52 may include a user of the mobile device 14 touching or swiping the icon 25 shown in FIG. 1 in a user-initiated action. In other embodiments the request may be generated automatically and/or remotely, e.g., by the response system 45, the base station 12, or another remote entity such as a web site, warehouse, police dispatcher, etc. The method 50 repeats step S51 when a need has not presented itself that refinement of the GPS accuracy of the mobile device 14 is needed. The method 50 continues to step S53 when the request for improved accuracy of the GPS location of the mobile device 14 is detected.

Step S53 includes refining the GPS location estimates of the mobile device 14 using any of the GPS position correction techniques noted above, i.e., Differential Correction, RTK, or LAAS. The method 50 proceeds to step S54 after the mobile device 14 and/or the base station 12 have executed the geoposition correction technique.

At step S54, the method 50 may include executing a control action, e.g., of the mobile device 14 or the external response system(s) 45 using the refined or corrected geoposition from step S53. For example, step S54 may include controlling an action of the response system 45 of FIGS. 1 and 2 responsive to the corrected geoposition.

As a non-limiting example illustration of the method 50, a user of the mobile device 14 of FIGS. 1-3 may request delivery of a package from an online supplier. The supplier notifies the user via SMS text message to the mobile device 14 when delivery has been scheduled. The text message may include a request to input a one-time request for enhanced geoposition, such as a text prompt to the user to touch the icon 25 when the user is present at a desired point of delivery of the package. The user then touches the icon 25, thus triggering execution of step S53.

Once the geoposition of the mobile device 14 is corrected via the techniques described above, the corrected geoposition may be recorded in memory M1 or M2, and/or transmitted to the online supplier. In turn, the online supplier may transmit the refined geoposition information to the drone 30, such that the drone 30 is able to schedule flight operations accordingly. Similar approaches may be used with the first responder 40 or other external response system 45. In this manner, systems and techniques typically associated with high-accuracy, high-cost GPS positioning systems may be used in combination with low-cost, low-quality GPS hardware of the type typically found in a mobile device such as the mobile devices 14 described herein.

The detailed description and the drawings or figures are supportive and descriptive of the disclosure, but the inventive scope is defined solely by the claims. While some of the best modes and other embodiments for carrying out the disclosure have been described in detail herein, various alternative designs and embodiments exist within the intended scope of this disclosure. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for improving accuracy of a global positioning system (GPS)-based position (geoposition) of a portable mobile device, the method comprising:

in response to a user input to the portable mobile device indicative of a request for improved GPS location accuracy of the portable mobile device, wherein the portable mobile device is a cell phone, a tablet computer, or other portable electronic device:

establishing an internet connection between the portable mobile device and a base station having a reference geoposition determined using a respective time-stamped first set of GPS data from each of a plurality of GPS satellites; and transmitting an accuracy improvement request signal from the portable mobile device to the base station over the established internet connection;

receiving the reference geoposition of the base station over the established internet connection via a chipset or a processor of the portable mobile device;

determining a time-stamped second set of GPS data using a receiver and the chipset or processor of the portable mobile device, the time-stamped second set of GPS data describing the geoposition of the portable mobile device with a GPS accuracy or resolution less than that of the base station, wherein respective times of collection of the time-stamped first and second sets of GPS data coincide, and wherein the time-stamped first and second sets of GPS data each includes respective code phase data, carrier phase data, and pseudo-range data from each of the GPS satellites;

generating a corrected geoposition of the portable mobile device, via the chipset or processor of the portable mobile device, using a predetermined GPS position correction technique and the time-stamped first and second sets of GPS data; and controlling, via the portable mobile device, an action of an external response system in communication therewith using the corrected geoposition of the portable mobile device, including transmitting the corrected geoposition to the external response system via the portable mobile device.

2. The method of claim 1, wherein the predetermined GPS position correction technique is a Real-Time Kinematic (RTK) technique using the code phase data, the pseudo-range data, and the carrier phase data.

3. The method of claim 1, wherein the base station includes a plurality of the GPS receivers, and wherein the predetermined GPS position correction technique is a Local Area Augmentation System (LAAS)-based/Ground Based Augmentation System (GBAS)-based correction technique that calculates an average position of the GPS receivers.

4. The method of claim 1, wherein the base station includes a plurality of base stations each in communication with the portable mobile device, the method further comprising:

determining, via the portable mobile device over the established internet connection, which of the plurality of base stations is closest in proximity to the portable mobile device, wherein receiving the reference geoposition of the base station includes receiving the first sets of GPS data from the closest base station.

5. The method of claim 1, wherein the predetermined GPS position correction technique is a Real-Time Kinematic (RTK) technique that includes:

determining a number of carrier cycles between the GPS satellites and each of the mobile device and base station; and multiplying the number of carrier cycles by a carrier wavelength as reported by the GPS satellites.

6. The method of claim 1, wherein receiving the reference geoposition includes the portable mobile device receiving the time-stamped first sets of GPS data from the base station as unprocessed measurements, the method further comprising the portable mobile device processing the received time-stamped first sets of GPS data.

7. The method of claim 1, wherein the external response system includes a drone, and wherein the controlled action includes directing the drone to the portable mobile device.

8. The method of claim 1, wherein the external response system includes a first responder, and wherein the controlled action includes directing the first responder to the portable mobile device.

9. The method of claim 1, wherein the time-stamped first sets of GPS data are received via the base station from the GPS satellites, and wherein the base station calculates the reference geoposition based on the received time-stamped first sets of GPS data to a first level of accuracy.

10. The method of claim 9, wherein determining the time-stamped second set of GPS data includes:

receiving, via the receiver of the portable mobile device, respective time-stamped second sets of GPS data from the GPS satellites, and calculating, via the processor of the portable mobile device, the geoposition of the portable mobile device based on the received time-stamped second sets of GPS data to a second level of accuracy less than the first level of accuracy.

11. The method of claim 10, wherein the first and second sets of GPS data both include a first set of GPS data signals output via a first of the GPS satellites, and a second set of GPS data signals output via a second of the GPS satellites.

12. A base station having a reference geoposition, the base station comprising:

a global positioning system (GPS) receiver configured to receive a respective time-stamped first set of GPS data from each of a plurality of GPS satellites;

a chipset or a processor in communication with the GPS receiver; and memory on which is recorded instructions that, when executed by the processor, causes the base station to:

establish an internet connection with a portable mobile device, wherein the portable mobile device is a cell phone, a tablet computer, or other portable electronic device;

receive an accuracy improvement request signal from the portable mobile device;

receive a second set of GPS data from the portable mobile device over the established internet connection, the second set of GPS data describing a geoposition of the portable mobile device and having a time of collection that coincides with a time of collection of the time-stamped first sets of GPS data, wherein the first and second sets of GPS data each includes respective code phase data, carrier phase data, and pseudo-range data from each of the GPS satellites;

generate, via a predetermined GPS position correction technique, a corrected geoposition of the portable mobile device using the processor and the first and second sets of GPS data; and transmit the corrected geoposition of the mobile device to the portable mobile device and an external response system.

13. The base station of claim 12, wherein the predetermined GPS position correction technique is a Real-Time Kinematic (RTK) technique using the code phase data, the pseudo-range data, and the carrier phase data.

14. The base station of claim 12, wherein the GPS receiver includes a plurality of the GPS receivers, and wherein the predetermined GPS position correction technique is a Local Area Augmentation System (LAAS)-based/ Ground Based Augmentation System (GBAS)-based correction technique that calculates an average position of the GPS receivers.

15. A portable mobile device comprising:
a global positioning system (GPS) receiver configured to receive a respective time-stamped set of GPS data from each of a plurality of GPS satellites;
a chipset or a processor in communication with the GPS receiver, wherein the portable mobile device is a cell phone, a tablet computer, or other portable electronic device, and wherein the chipset or processor and the GPS receiver of the portable mobile device together provide a first GPS accuracy or resolution; and
memory on which is recorded instructions that, when executed by the processor, causes the portable mobile device to:
receive a user input indicative of a request for improved GPS location accuracy of the portable mobile device;
responsive to receipt of the user input, establish an internet connection between the portable mobile device and a base station having a reference geoposition of a second GPS accuracy or resolution that exceeds the first GPS accuracy or resolution of the portable mobile device;
transmit an accuracy improvement request signal to the base station over the established internet connection, in response to the user input to the portable mobile device;
receive another time-stamped set of GPS data from the base station over the established internet connection describing the reference geoposition of the base station with a second GPS accuracy or resolution that exceeds the first GPS accuracy or resolution of the mobile device, wherein a time of collection of the respective time-stamped sets of GPS data from the portable mobile device and the base station coincide, and the time-stamped sets of GPS data each includes respective code phase data, carrier phase data, and pseudo-range data from each of the GPS satellites;
generate, via a predetermined GPS position correction technique, a corrected geoposition of the portable mobile device using the processor and the first and second sets of GPS data; and
automatically request execution of a control action of an external response system using the corrected geoposition, including transmitting the corrected geoposition to the external response system.

16. The portable mobile device of claim 15, wherein the predetermined GPS position correction technique is a Real-Time Kinematic (RTK) technique using the code phase data, the pseudo-range data, and the carrier phase data.

17. The portable mobile device of claim 15, wherein the external response system includes a drone.

18. The portable mobile device of claim 15, wherein the external response system includes a first responder.

19. The portable mobile device of claim 15, wherein the predetermined GPS position correction technique is a Real-Time Kinematic (RTK) technique that includes:
determining a number of carrier cycles between the GPS satellites and each of the mobile device and base station; and
multiplying the number of carrier cycles by a carrier wavelength as reported by the GPS satellites.

20. The portable mobile device of claim 15, wherein the time-stamped sets of GPS data received by the portable mobile device from the GPS satellites and the base station all include a first set of GPS data signals output via a first of the GPS satellites, and a second set of GPS data signals output via a second of the GPS satellites.

* * * * *